United States Patent
Uehara

(10) Patent No.: US 11,608,862 B2
(45) Date of Patent: Mar. 21, 2023

(54) SPRING SEAT AND DAMPER DEVICE

(71) Applicant: EXEDY Corporation, Neyagawa (JP)

(72) Inventor: Hiroshi Uehara, Neyagawa (JP)

(73) Assignee: EXEDY CORPORATION, Neyagawa (JP)

( * ) Notice: Subject to any disclaimer, the term of this patent is extended or adjusted under 35 U.S.C. 154(b) by 206 days.

(21) Appl. No.: 17/158,339

(22) Filed: Jan. 26, 2021

(65) Prior Publication Data

US 2021/0262527 A1  Aug. 26, 2021

(30) Foreign Application Priority Data

Feb. 26, 2020 (JP) .............................. JP2020-030441

(51) Int. Cl.
*F16D 3/12* (2006.01)
*F16F 15/123* (2006.01)
*F16D 7/02* (2006.01)

(52) U.S. Cl.
CPC ............ *F16D 3/12* (2013.01); *F16F 15/1232* (2013.01); *F16D 7/025* (2013.01); *F16D 2300/22* (2013.01); *F16F 2230/0005* (2013.01); *F16F 2232/02* (2013.01); *F16F 2236/08* (2013.01)

(58) Field of Classification Search
CPC ........ F16D 3/12; F16D 7/025; F16D 2300/22; F16F 15/1232; F16F 2230/0005; F16F 2232/02; F16F 2236/08

USPC .............................. 464/68.92; 267/170, 178
See application file for complete search history.

(56) References Cited

U.S. PATENT DOCUMENTS

| | | | | |
|---|---|---|---|---|
| 2,760,360 | A * | 8/1956 | Binder | F16D 13/68 |
| | | | | 464/68.92 |
| 5,401,213 | A * | 3/1995 | Muchmore | F16F 15/129 |
| 6,676,525 | B2 * | 1/2004 | Uehara | F16F 1/025 |
| | | | | 464/68.92 |
| 6,712,705 | B2 * | 3/2004 | Uehara | F16F 15/123 |
| | | | | 464/68.92 |

FOREIGN PATENT DOCUMENTS

JP        2011-226572 A    11/2011

* cited by examiner

*Primary Examiner* — Greg Binda
(74) *Attorney, Agent, or Firm* — United IP Counselors, LLC

(57) ABSTRACT

A damper device includes a first rotor, a second rotor, a plurality of elastic members, and a spring seat. The spring seat includes an end surface support portion and an outer periphery support portion. The end surface support portion includes a recess on a radially middle part thereof. The recess is recessed toward at least one of the elastic members. The end surface support portion supports one end surface of the at least one of the elastic members. The end surface support portion is supported by a pressing surface of a first accommodation portion of the first rotor and a pressing surface of a second accommodation portion of the second rotor. The outer periphery support portion supports part of a radially outer part of the at least one of the elastic members.

5 Claims, 5 Drawing Sheets

SPRING SEAT AND DAMPER DEVICE

CROSS-REFERENCE TO RELATED APPLICATIONS

This application claims priority to Japanese Patent Application No. 2020-030441, filed Feb. 26, 2020. The contents of that application are incorporated by reference herein in their entirety.

TECHNICAL FIELD

The present invention relates to a spring seat and a damper device.

BACKGROUND ART

A type of hybrid vehicle including an engine and an electric motor, for instance, uses such a damper device having a torque limiter function as described in Japan Laid-open Patent Application Publication No. 2011-226572 in order to prevent transmission of an excessive torque from an output side to an engine side in engine start and so forth.

The damper device described in Japan Laid-open Patent Application Publication No. 2011-226572 includes a damper part, composed of a side plate provided as an input rotor, a hub plate provided as an output rotor and a plurality of coil springs, and a torque limiter disposed on an outer peripheral side of the damper part. The damper part and the torque limiter are coupled by rivets. Besides, a plate composing part of the torque limiter is fixed to a flywheel by bolts.

The plurality of coil springs of the damper part are herein disposed in a plurality of window portions of the side plate. When the side plate and the hub plate are rotated relative to each other, the coil springs are compressed between both plates in a rotational direction. Centrifugal forces herein act on the coil springs. Hence, when compressed, the coil springs are moved radially outward. As a result, the coil springs slide against the window portions, whereby friction resistance is generated between the coil springs and the side plate. The damper part degrades in performance of attenuating rotational fluctuations due to the friction resistance.

In view of this, a pair of spring seats is attached to both ends of each coil spring. The pair of spring seats supports the end surfaces and part of a radially outer part of each coil spring, whereby the coil springs are prevented from sliding against the window portions.

In general, the damper device is herein provided with a stopper mechanism for restricting the angle of relative rotation (torsion angle) between the input rotor and the output rotor to a predetermined angular range. The stopper mechanism is composed of, for instance, stop pins mounted on the input rotor and circular-arc stopper holes provided in the output rotor.

Enlarging the torsion angle between the input rotor and the output rotor as much as possible (i.e., widening of angle) is preferable for making the damper device obtain good performance of attenuating rotational fluctuations. In order to achieve widening of angle, it is required to reliably elongate stopper holes in the output rotor.

However, when the spring seats are provided on both ends of the respective coil springs as described above, chances are often that the spring seats are disposed in positions radially overlapping with the stopper holes. Because of this, when the spring seats are provided, the stopper holes cannot be elongated; widening of angle is hindered.

BRIEF SUMMARY

It is an object of the present invention to enable a circumferentially elongated hole to be formed, as a component of a stopper mechanism, in a damper device in which a spring seat is installed.

(1) A spring seat according to the present invention is installed in a damper device including a first rotor, a second rotor and a plurality of elastic members. The spring seat supports at least one end surface of at least one of the plurality of elastic members. The first rotor includes a plurality of first accommodation portions. The plurality of first accommodation portions each include a pair of first pressing surfaces on both circumferential end surfaces thereof. The second rotor is rotatable relative to the first rotor. The second rotor includes a plurality of second accommodation portions. The plurality of second accommodation portions each include a pair of second pressing surfaces on both circumferential end surfaces thereof. The plurality of elastic members are accommodated in a plurality of pairs of the first and second accommodation portions. The plurality of elastic members elastically couple the first rotor and the second rotor in a rotational direction.

The spring seat includes an end surface support portion and an outer periphery support portion. The end surface support portion includes a recess on a radially middle part thereof. The recess is recessed toward the at least one of the plurality of elastic members. The end surface support portion supports the at least one end surface of the at least one of the plurality of elastic members. The end surface support portion is supported by one of the pair of first pressing surfaces of the first accommodation portion accommodating the at least one of the plurality of elastic members and one of the pair of second pressing surfaces of the second accommodation portion accommodating the at least one of the plurality of elastic members. The outer periphery support portion supports part of a radially outer part of the at least one of the plurality of elastic members.

The at least one of the elastic members is herein supported, through the spring seat, by one of the pair of first pressing surfaces of the first accommodation portion accommodating the at least one elastic member and one of the pair of second pressing surfaces of the second accommodation portion accommodating the at least one elastic member. The spring seat is provided with the recess on the end surface support portion thereof. Because of this, the protruding portion, configured to be fitted to the recess, can be formed on one of the pair of second pressing surfaces of the second accommodation portion. Therefore, when it is assumed to form a stopper mechanism for restricting relative rotation between the first rotor and the second rotor by a stopper hole having a circular-arc shape and a member penetrating the stopper hole, the stopper hole can be elongated at one end thereof toward the protruding portion formed on the above-mentioned one of the pair of second pressing surfaces. As a result, enlarging the torsion angle between the first rotor and the second rotor (i.e., widening of angle) is made possible.

(2) Preferably, the recess includes a hole circumferentially penetrating therethrough. The recess, when thus provided with the hole, can be shaped as deeply as possible. As a result, the protruding portion on the above-mentioned one of the pair of second pressing surfaces can be protruded as largely as possible, whereby, for instance, the above-mentioned stopper hole can be further elongated.

(3) Preferably, the first rotor includes a first plate and a second plate that are disposed axially apart from each other at an interval. In this case, the second rotor is disposed axially between the first plate and the second plate.

(4) A damper device according to the present invention includes a first rotor, a second rotor, a plurality of elastic members, a stopper mechanism, and the spring seat. The first rotor includes a plurality of first accommodation portions. The plurality of first accommodation portions each include a pair of first pressing surfaces on both circumferential end surfaces thereof. The second rotor is rotatable relative to the first rotor. The second rotor includes a plurality of second accommodation portions. The plurality of second accommodation portions each include a pair of second pressing surfaces on both circumferential end surfaces thereof. The plurality of elastic members are accommodated in a plurality of pairs of the first and second accommodation portions. The plurality of elastic members elastically couple the first rotor and the second rotor in a rotational direction. The stopper mechanism includes a stop member and a stopper hole. The stop member is mounted on the first rotor. The stopper hole is provided in the second rotor. The stopper hole is circumferentially elongated and is penetrated by the stop member. The spring seat supports at least one end surface of at least one of the plurality of elastic members and has the configuration specified as described above.

(5) Preferably, the second rotor includes a protruding portion circumferentially protruding on at least one of the pair of second pressing surfaces of the second accommodation portion accommodating the at least one of the plurality of elastic members. The protruding portion is fitted to the recess of the spring seat. In this case, the stopper hole extends at one circumferential end thereof toward the protruding portion.

Overall, according to the present invention described above, a circumferentially elongated stopper hole can be formed, as a component of a stopper mechanism, in a damper device in which a spring seat is installed; good performance of attenuating rotational fluctuations can be obtained by the damper device.

DETAILED DESCRIPTION

[Entire Configuration]

Figure 1:
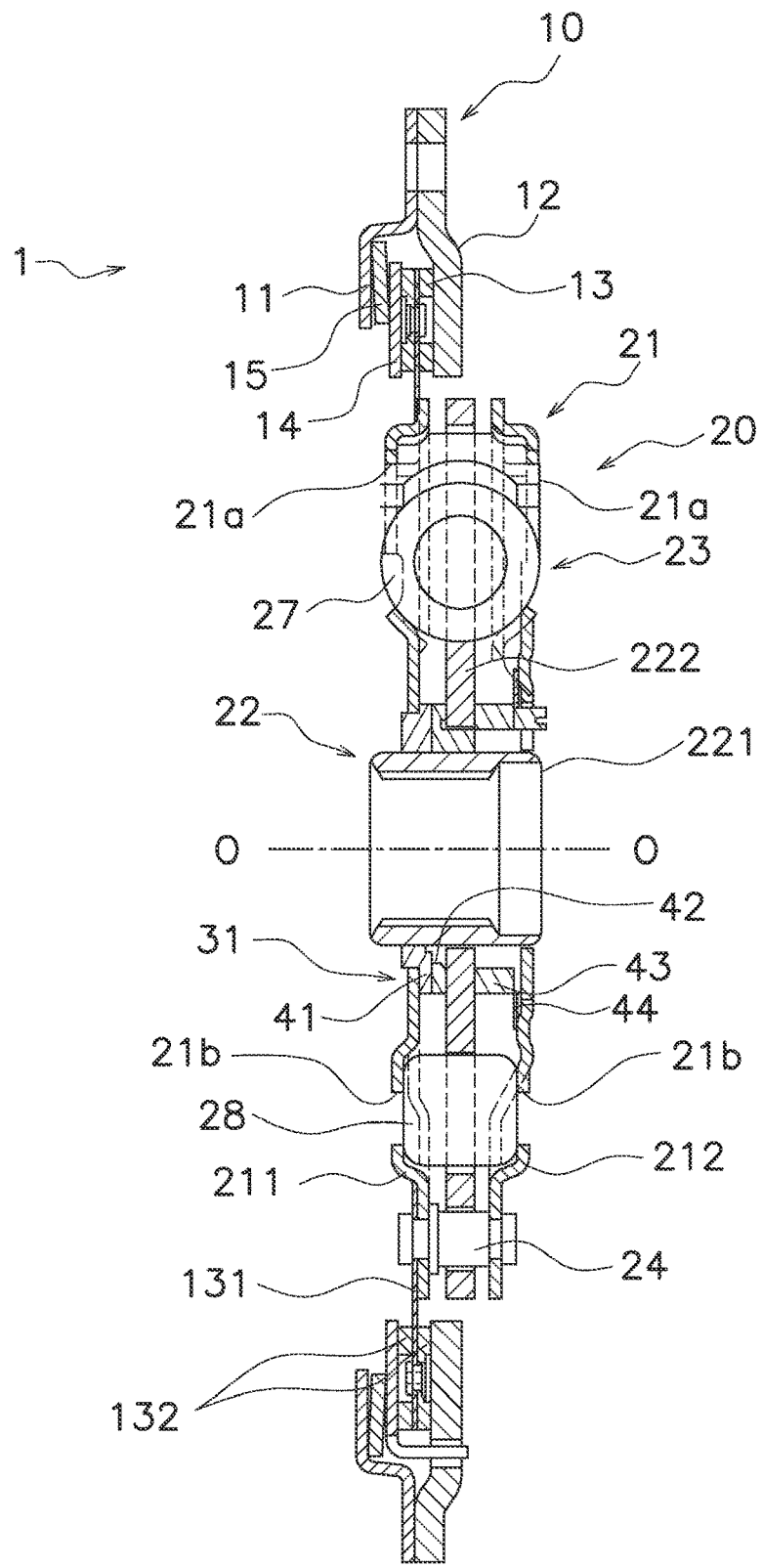
FIG. 1 is a cross-sectional view of a torque limiter embedded damper device according to a preferred embodiment of the present invention.
Figure 2:
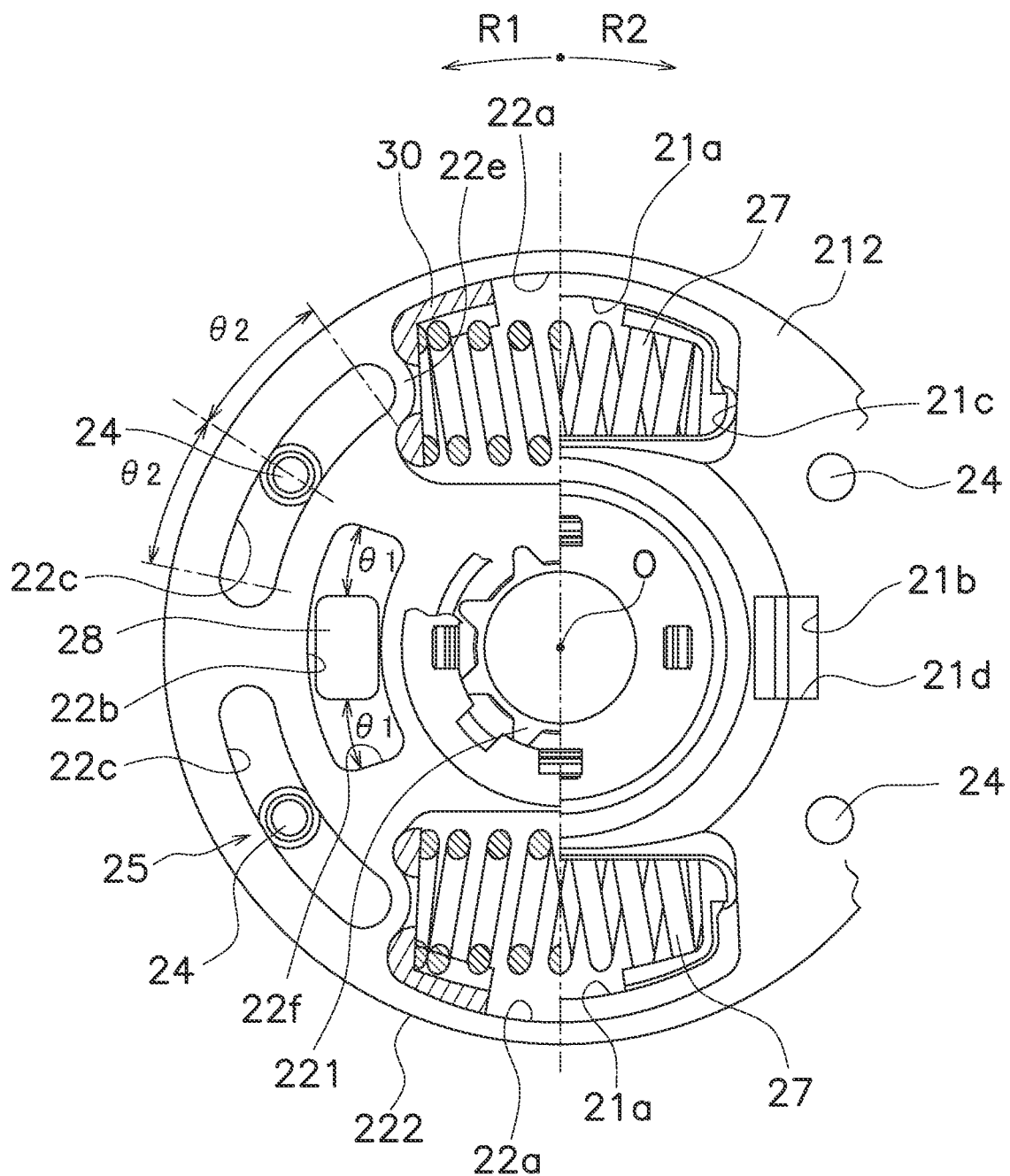
FIG. 2 is a front view of a damper unit of the damper device shown in FIG. 1.

FIG. 1 is a cross-sectional view of a torque limiter embedded damper device 1 (hereinafter simply referred to as "damper device 1" on an as-needed basis) according to a preferred embodiment of the present invention. On the other hand, FIG. 2 is a front view of the damper device 1 in a condition that some constituent members are detached therefrom or are not illustrated in part. In FIG. 1, line O-O indicates a rotational axis. In FIG. 1, an engine is disposed on the left side of the damper device 1, whereas a drive unit, including an electric motor, a transmission and so forth, is disposed on the right side of the damper device 1.

It should be noted that in the following explanation, the term "axial direction" refers to an extending direction of the rotational axis O of the damper device 1. On the other hand, the term "circumferential direction" refers to a circumferential direction of an imaginary circle about the rotational axis O, whereas the term "radial direction" refers to a radial direction of the imaginary circle about the rotational axis O. It should be noted that the circumferential direction is not required to be perfectly matched with that of the imaginary circle about the rotational axis O, and is conceptualized as encompassing, for instance, a right-and-left direction defined based on a window portion and a window hole, both of which are illustrated in an upper part of FIG. 2. Likewise, the radial direction is not required to be perfectly matched with a diameter direction of the imaginary circle about the rotational axis O, and is conceptualized as encompassing, for instance, an up-and-down direction defined based on the window portion and the window hole, both of which are illustrated in the upper part of FIG. 2.

The damper device 1 is a device provided between a flywheel and an input shaft of the drive unit (both of which are not illustrated in the drawings) in order to limit a torque transmitted between the engine and the drive unit and attenuate rotational fluctuations. The damper device 1 includes a torque limiter unit 10 and a damper unit 20.

[Torque Limiter Unit 10]

The torque limiter unit 10 is disposed on the outer peripheral side of the damper unit 20. The torque limiter unit 10 limits a torque transmitted between the flywheel and the damper unit 20. The torque limiter unit 10 includes first and second side plates 11 and 12, a friction disc 13, a pressure plate 14 and a cone spring 15.

The first and second side plates 11 and 12 are fixed to each other by a plurality of rivets. The friction disc 13 includes a core plate 131 and a pair of friction members 132. The pressure plate 14 and the cone spring 15 are disposed between the first side plate 11 and the friction disc 13. The cone spring 15 presses the friction disc 13 onto the second side plate 12 through the pressure plate 14.

[Damper Unit 20]

The damper unit 20 is composed of an input-side plate 21 (exemplary first rotor), a hub flange 22 (exemplary second rotor) and a damper part 23 disposed between the input-side plate 21 and the hub flange 22.

<Input-Side Plate 21>

The input-side plate 21 includes a first plate 211 and a second plate 212 (both of which will be hereinafter collectively referred to as "the input-side plate 21" on an as-needed basis). Each of the first and second plates 211 and 212 is an annular member having a center hole. The first and second plates 211 and 212 are fixed to each other at a predetermined axial interval by four stop pins 24. Therefore, the first and second plates 211 and 212 are immovable relative to each other in both axial and rotational directions. Besides, the core plate 131 of the friction disc 13 is fixed at the inner peripheral part thereof to the first plate 211 by the stop pins 24.

Each of the first and second plates 211 and 212 is provided with a pair of first window portions 21a (exemplary first accommodation portions) and a pair of second window portions 21b. The pair of first window portions 21a is disposed in opposition to each other through the rotational axis O. FIG. 2 depicts the pair of first window portions 21a and one of the pair of second window portions 21b in the second plate 212, but the configurations of the window portions 21a and 21b are similarly true of those in the first plate 211. The pair of first window portions 21a is formed by cutting and raising each plate 211, 212. Each first window portion 21a includes a pair of pressing surfaces 21c (exemplary first pressing surfaces) on both circumferential end surfaces thereof and includes a pair of support portions on the outer and inner peripheral edges thereof. Besides, the pair of second window portions 21b is disposed in opposition to each other through the rotational axis O, while shifting at an angular interval of 90 degrees from the pair of first window portions 21a. The pair of second window portions 21b is a pair of rectangular openings axially penetrating each plate 211, 212, and each includes a pair of pressing surfaces 21d on both circumferential end surfaces thereof <Hub Flange 22>

The hub flange 22 is a member for transmitting a torque, inputted thereto from the input-side plate 21, to an output-side device. The hub flange 22 includes a hub 221 and a flange 222. As shown in FIG. 2, the hub 221 and the flange 222 are integrated by a plurality of teeth and a plurality of recesses with which the plural teeth are meshed.

The hub 221 is a tubular member and is disposed within the center holes of the first and second plates 211 and 212. The hub 221 is provided with a spline hole in the inner peripheral part thereof, whereby an output-side member is capable of being spline-coupled to the spline hole.

Figure 3:
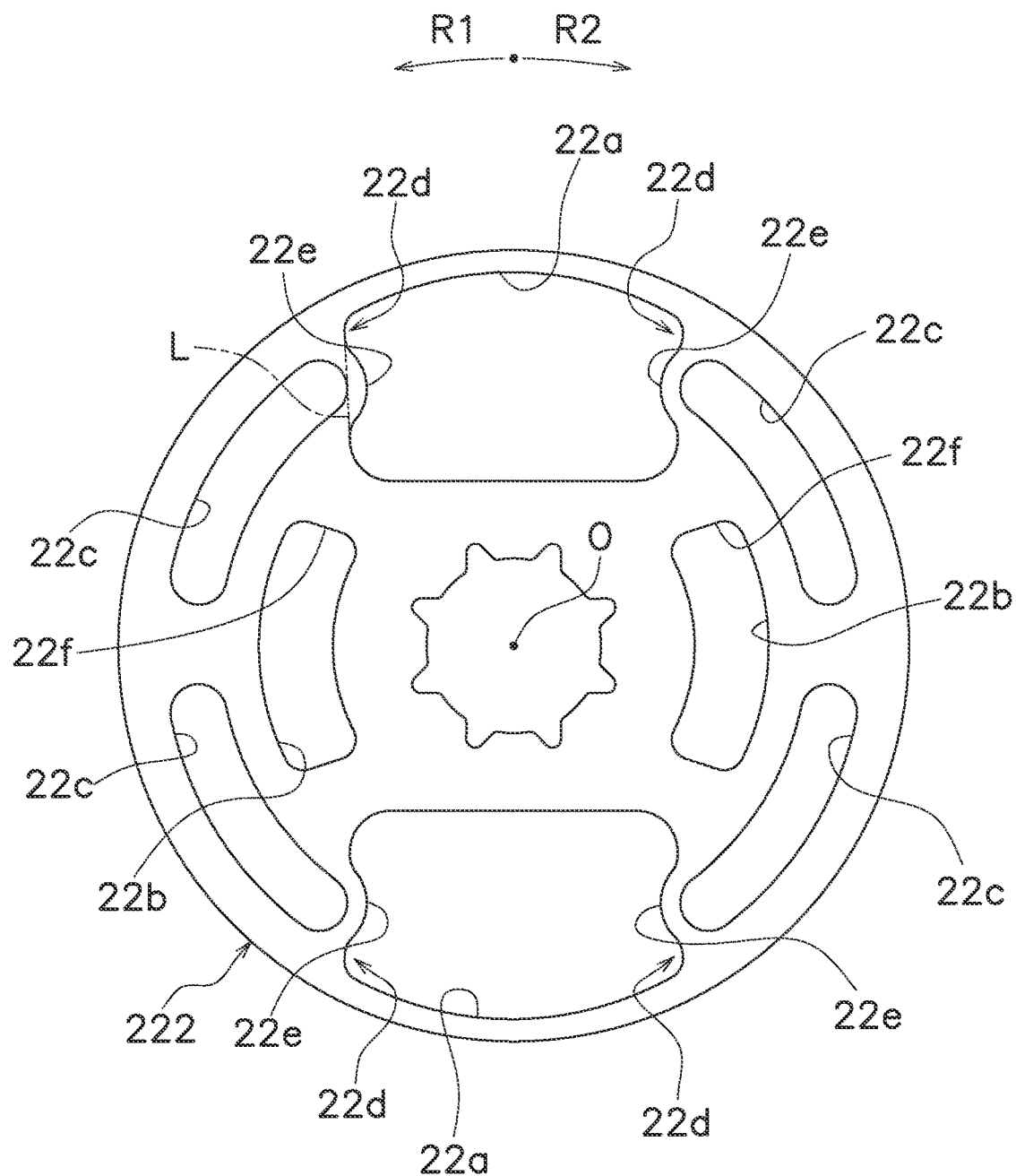
FIG. 3 is a front view of a flange.

As shown in FIGS. 2 and 3, the flange 222 is made in the shape of a disc and is disposed axially between the first plate 211 and the second plate 212. The flange 222 includes a center hole, a pair of first window holes 22a (exemplary second accommodation portions), a pair of second window holes 22b, and four stopper holes 22c.

The pair of first window holes 22a is disposed in opposition to each other through the rotational axis O while being provided in corresponding positions to the pair of first window portions 21a of the first plate 211 and that of the second plate 212. Each first window hole 22a includes a pair of pressing surfaces 22d (exemplary first pressing surfaces) on both circumferential end surfaces thereof. Besides, each of the pair of pressing surfaces 22d includes a protruding portion 22e, protruding to bulge toward the other opposed pressing surface 22d, on a radially center part thereof.

The pair of second window holes 22b is disposed in opposition to each other through the rotational axis O, while shifting at an angular interval of 90 degrees from the pair of first window holes 22a. In other words, the pair of second window holes 22b is provided in corresponding positions to the pair of second window portions 21b of the first plate 211 and that of the second plate 212. Each second window hole 22b is made in the shape of a circular arc, and a pitch radius (a radius at the middle position of the radial width) of each second window hole 22b is defined radially inside the radially center position in each first window hole 22a. Each second window hole 22b includes a pair of pressing surfaces 22f on both circumferential end surfaces thereof, the distance between the pair of pressing surfaces 22f is set to be longer than that between the pair of pressing surfaces 21d of each second window portion 21b in the input-side plate 21.

The stopper holes 22c are elongated holes, each of which extends in the shape of a circular arc. The stopper holes 22c are provided on both sides of the respective first window holes 22a in the circumferential direction. Each stopper hole 22c extends, at one end thereof located apart from the first window hole 22a adjacent thereto, to a position radially outside the second window hole 22b near thereto. On the other hand, each stopper hole 22c extends, at the other end thereof located closer to the adjacent first window hole 22a, toward adjacent one of the pair of protruding portions 22e in the adjacent first window hole 22a. Specifically, each stopper hole 22c reaches a line segment L at the other end thereof located closer to the adjacent first window hole 22a. The line segment L is herein defined as an imaginary line segment connecting the outer and inner peripheral parts (not provided with the protruding portions 22e) of each end surface of each first window hole 22a.

In the configuration described above, each stopper hole 22c can be shaped to extend longer at the end thereof located closer to the adjacent first window hole 22a than in a configuration that the adjacent first window hole 22a is not provided with the pair of protruding portions 22e. As a result, the angle formed by the rotational axis O and each pair of stop pins 24 interposing therebetween each first window hole 22a can be set to approach 90 degrees. It should be noted that the pitch radii of the four stopper holes 22c are equal. In other words, the four stopper holes 22c are aligned on the circumference of an imaginary identical circle.

Besides, the stopper holes 22c are axially penetrated by the stop pins 24, respectively. Because of this, the input-side plate 21 and the hub flange 22 are rotatable relative to each other within a range that each stop pin 24 is movable within each stopper hole 22c. In other words, the stop pins 24 and the stopper holes 22c compose a stopper mechanism 25. The input-side plate 21 and the hub flange 22 are prevented from rotating relative to each other when each stop pin 24 makes contact with one end surface of each stopper hole 22c.

<Damper Part 23>

The damper part 23 is a mechanism for elastically coupling the input-side plate 21 and the hub flange 22 in the rotational direction. As shown in FIGS. 1 and 2, the damper part 23 includes two coil springs 27, two resin members 28, two pairs of spring seats 30, each pair of which supports both end surfaces of each coil spring 27, and a hysteresis generating mechanism 31 (see FIG. 1).

The coil springs 27 are accommodated in the pair of first window holes 22a of the flange 222, respectively, whereas the resin members 28 are accommodated in the pair of second window holes 22b of the flange 222, respectively. Besides, the coil springs 27 are axially and radially supported by the pair of first window portions 21a of the first plates 211 and that of the second plates 212, respectively, whereas the resin members 28 are axially and radially supported by the pair of second window portions 21b of the first plate 211 and that of the second plate 212.

It should be noted that each resin member 28 is disposed in each second window portion 21b of the input-side plate 21 without any circumferential gap. On the other hand, each resin member 28 is shorter than the circumferential width of each second window hole 22b of the flange 222. In other words, in a neutral state without relative rotation between the input-side plate 21 and the hub flange 22 (i.e., the torsion angle is "0"), gaps (to be described below in detail) are produced between both ends of each resin member 28 and the pair of pressing surfaces 22f of each second window hole 22b of the flange 222.

Each pair of spring seats 30 is disposed on both circumferential ends of each first window hole 22a of the flange 222. Each pair of spring seats 30 supports the end surfaces of each coil spring 27 and supports part of the outer peripheral part (both circumferential ends) of each coil spring 27.

Figure 4:
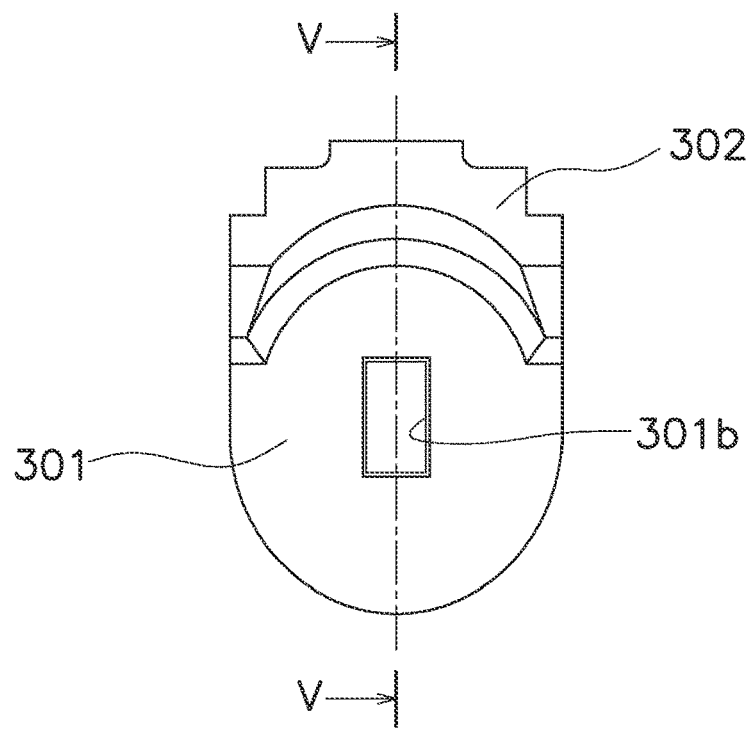
FIG. 4 is a side view of a spring seat.
Figure 5:
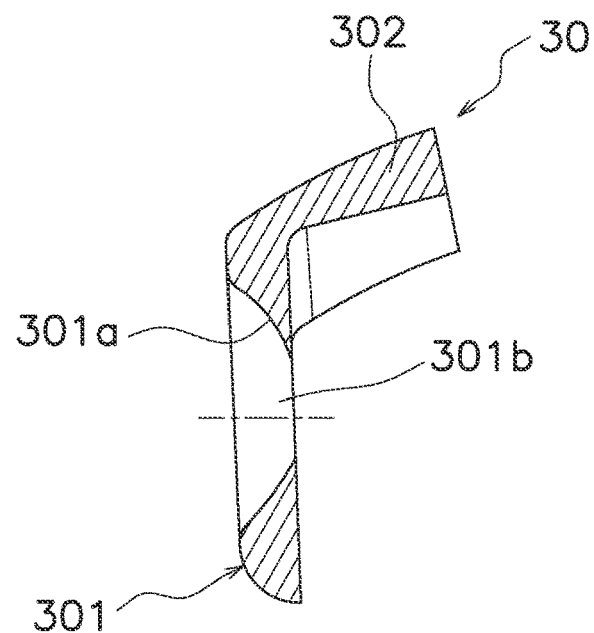
FIG. 5 is a cross-sectional view of FIG. 4 taken along line V-V.

As shown in FIGS. 4 and 5, each spring seat 30 includes an end surface support portion 301 and an outer periphery support portion 302. It should be noted that FIG. 4 is a side view of each spring seat 30 (as seen from one side in the circumferential direction), whereas FIG. 5 is a cross-sectional view of FIG. 4 taken along line V-V.

The end surface support portion 301 supports the one-side end surface of each coil spring 27, while being supported by the one-side pressing surface 21c of each first window portion 21a accommodating each coil spring 27 in each plate 211, 212 composing the input-side plate 21 and the one-side pressing surface 22d of each first window hole 22a accommodating each coil spring 27 in the flange 222. As shown in FIG. 5, the end surface support portion 301 is provided with a recess 301a, recessed in a circular-arc shape toward each coil spring 27, on the surface thereof supported by the one-side pressing surface 22d of each first window hole 22a accommodating each coil spring 27. Besides, the recess 301a includes a hole 301b circumferentially penetrating a middle part thereof (i.e., a part located in the middle thereof in both radial and axial directions). Furthermore, the one-side protruding portion 22e of each first window hole 22a accommodating each coil spring 27 in the flange 222 is fitted into the recess 301a.

As described above, each coil spring 27 is accommodated in each first window portion 21a of the first plate 211, that of the second plate 212, and each first window hole 22a of the flange 222 through each pair of spring seats 30 without any circumferential gap.

The outer periphery support portion 302 is provided to extend from the outer peripheral end of the end surface support portion 301 in the circumferential direction. The outer periphery support portion 302 is disposed between the outer peripheral part of one end of each coil spring 27 and both the inner peripheral surface of each first window hole 22a and the inner peripheral surface of each first window portion 21a of each plate 211, 212. Because of this, even when each coil spring 27 is moved to the outer peripheral side either by a centrifugal force or in a compressed state, contact can be avoided between each coil spring 27 and both each first window hole 22a and each first window portion 21a of each plate 211, 212.

The hysteresis generating mechanism 31 is disposed axially between the hub flange 22 and the first and second plates 211 and 212. As shown in FIG. 1, the hysteresis generating mechanism 31 includes a first bushing 41, a second bushing 42, a third bushing 43 and a cone spring 44.

The first and second bushings 41 and 42 are disposed on the outer peripheral surface of the hub 221, while being disposed axially between the flange 222 and the inner peripheral end of the first plate 211. The second bushing 42 is engaged with the hub 221, while being non-rotatable relative thereto. The second bushing 42 makes contact by friction with the first bushing 41. The third bushing 43 is disposed axially between the flange 222 and the inner peripheral end of the second plate 212. The third bushing 43 is engaged with the second plate 212, while being non-rotatable relative thereto. The third bushing 43 makes contact by friction with the flange 222. The cone spring 44 is disposed in a compressed state between the third bushing 43 and the second plate 212.

Due to the configuration described above, when the hub flange 22 and the first and second plates 211 and 212 are rotated relative to each other, a hysteresis torque is generated.

[Action]

A torque, transmitted from the engine to the flywheel, is inputted to the damper unit 20 through the torque limiter unit 10. In the damper unit 20, the torque is inputted to the input-side plate 21 to which the friction disc 13 of the torque limiter unit 10 is fixed, and is then transmitted to the hub flange 22 through the coil springs 27 and the resin members 28. Subsequently, power is transmitted from the hub flange 22 to the electric motor, the transmission, a power generator and so forth disposed on the output side.

Incidentally, for instance in starting the engine, chances are that an excessive torque is transmitted from the output side to the engine because the amount of inertia is large on the output side. In such a case, the magnitude of torque to be transmitted to the engine side is limited to a predetermined value or less by the torque limiter unit 10.

<Positive-Side Torsional Characteristics>

Explanation will be given for positive-side torsional characteristics obtained in the damper unit 20, namely, characteristics obtained when a torque is inputted from the engine (i.e., in input of a positive-side torque).

When the positive-side torque is inputted, the input-side plate 21 is rotated in an R1 direction in FIG. 2. Because of this, each of the two coil springs 27 is compressed between the spring seat 30 supported by the R2-side pressing surface 21c of each first window portion 21a in each plate 211, 212 composing the input-side plate 21 and the spring seat 30 supported by the R1-side pressing surface 22d of each first window hole 22a in the flange 222.

It should be noted that as shown in FIG. 2, although each resin member 28 is supported by each second window portion 21b of each plate 211, 212 composing the input-side plate 21 without any gap in the neutral state, circumferential gaps, each corresponding to a torsion angle $\theta 1$, are produced on the R1 and R2 sides of each resin member 28 in each second window hole 22b of the flange 222. On the other hand, circumferential gaps, each corresponding to a torsion angle $\theta 2$, are produced on the R1 and R2 sides of each stop pin 24 in each stopper hole 22c. Here, the circumferential gaps (hereinafter simply referred to as "gaps") are set to establish the following relation.

$\theta 1 < \theta 2$

Figure 6:
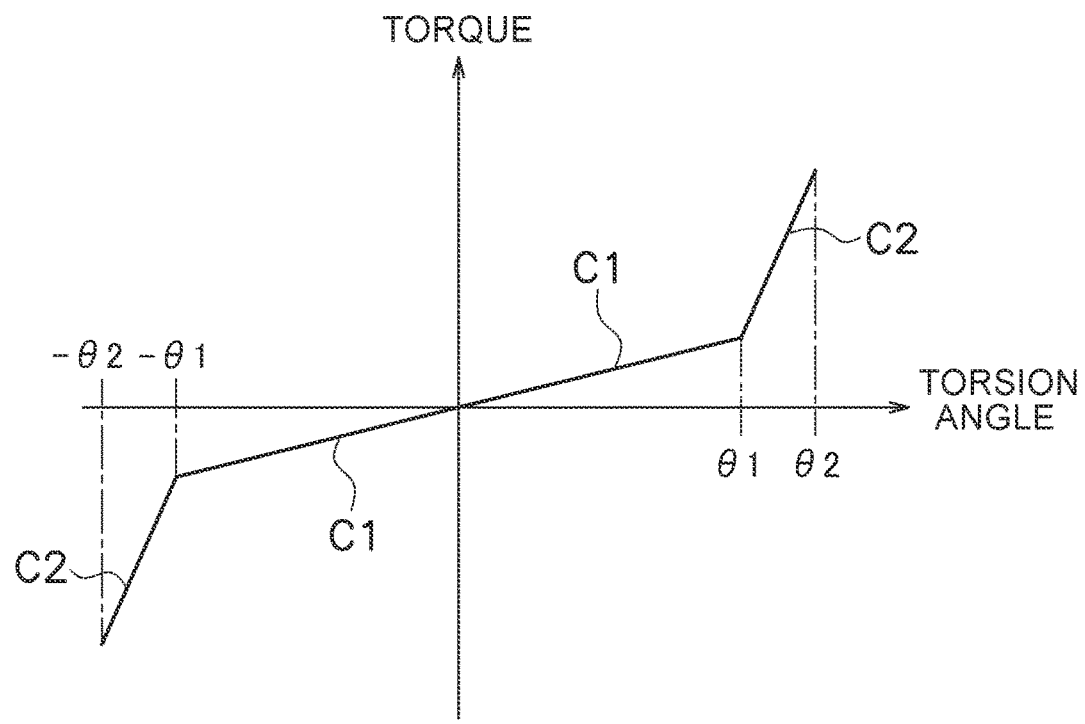
FIG. 6 is a chart showing torsional characteristics.

Due to the gap settings described above, each resin member 28 is not compressed until the torsion angle between the input-side plate 21 and the hub flange 22 reaches $\theta 1$ (it should be noted that the term "torsion angle" hereinafter refers to the torsion angle between the input-side plate 21 and the hub flange 22). When the torsion angle exceeds $\theta 1$, each resin member 28 is compressed between the R2-side pressing surfaces 21d of each second window portion 21b in each plate 211, 212 composing the input-side plate 21 and the R1-side pressing surface 22f of each second window hole 22b in the flange 222. Because of this, the positive-side torsional characteristics are obtained as shown in FIG. 6; characteristic C1 is obtained until the torsion angle reaches $\theta 1$, whereas characteristic C2 is obtained after the torsion angle reaches $\theta 1$.

Then, when the torsion angle reaches $\theta 2$, each stop pin 24 makes contact with the R1-side end surface of each stopper hole 22c, whereby the input-side plate 21 and the hub flange 22 are prevented from rotating relative to each other.

<Negative-Side Torsional Characteristics>

Explanation will be given for negative-side torsional characteristics obtained in the damper unit 20, namely, characteristics obtained when a torque is inputted reversely from the drive unit (i.e., in input of a negative-side torque).

When the negative-side torque is inputted, the hub flange 22 is rotated in the R1 direction with respect to the input-side plate 21 in FIG. 2. Because of this, each of the two coil springs 27 is compressed between the spring seat 30 attached to the R2-side pressing surface 22d of each first window hole 22a in the hub flange 22 and the spring seat 30 attached to the R1-side pressing surface 21c of each first window portion 21a in each plate 211, 212 composing the input-side plate 21.

Each resin member 28 is actuated in a similar manner to when the positive-side torque is inputted. Specifically, each resin member 28 is not compressed until the torsion angle reaches −θ1; when or before the torsion angle reaches −θ1, low-stiffness torsional characteristic C1 is obtained as shown in FIG. 6. Then, when the torsion angle exceeds −θ1, compression of each resin member 28 begins between the R2-side pressing surface 22f of each second window hole 22b in the hub flange 22 and the R1-side pressing surface 21d of each second window portion 21b in each plate 211, 212 composing the input-side plate 21. Because of this, when the torsion angle exceeds −θ1, high-stiffness torsional characteristic C2 is obtained as shown in FIG. 6.

When the torsion angle reaches −θ2, each stop pin 24 makes contact with the R2-side end surface of each stopper hole 22c, whereby the input-side plate 21 and the hub flange 22 are prevented from rotating relative to each other.

In the preferred embodiment described above, each spring seat 30 is provided with the recess 301a, and one of the protruding portions 22e provided in each first window hole 22a of the flange 222 is fitted into the recess 301a. Besides, the stopper hole 22c, located adjacent to each first window hole 22a, extends at one end thereof toward the above-mentioned one of the protruding portions 22e. Because of this, the stopper hole 22c can be elongated in the circumferential direction. In other words, enlarging the torsion angle between the input-side plate 21 and the hub flange 22 (i.e., widening of angle) is made possible, compared to a configuration that each spring seat 30 is not provided with the recess 301a, whereas each first window hole 22a includes end surfaces, each of which is made in the shape of a flat surface (without the protruding portion 22e).

Besides, due to a similar reason to the above, adjacent ends of the stopper holes 22c provided on both sides of each first window hole 22a in the flange 222 can be made closer to each other. As a result, the angle formed by the rotational axis O and the stop pins 24 disposed on both sides of each first window hole 22a can be set to approach 90 degrees, whereby inhomogeneity in strength of the input-side plate 21 and the hub flange 22 can be inhibited.

[Other Preferred Embodiments]

The present invention is not limited to the preferred embodiment described above, and a variety of changes or modifications can be made without departing from the scope of the present invention.

(a) In the preferred embodiment described above, the hub flange 22 is composed of two members: the hub 221 and the flange 222. However, the hub flange 22 may be composed of a single member.

(b) In the preferred embodiment described above, each coil spring is provided with the spring seats on both ends thereof, respectively. Alternatively, each coil spring may be provided with the spring seat only one end thereof. Yet alternatively, each coil spring may be provided with the spring seat according to the present invention on one end thereof, while being provided with another spring seat of a heretofore known type on the other end thereof.

(c) Components provided as the elastic members are not limited to two coil springs and two resin members. For example, all the components provided as the elastic members may be coil springs, and the number of the elastic members is not limited to a specific number.

(d) In the preferred embodiment described above, the present invention is applied to the torque limiter embedded damper device but is similarly applicable to another type of damper device.

(e) Torsional characteristics are not limited to those shown in FIG. 6.

REFERENCE SIGNS LIST

21 Input-side plate (first rotor)
211 First plate
212 Second plate
21a First window portion (first accommodation portion)
21c Pressing surface (first pressing surface)
22 Hub flange (second rotor)
22a First window hole (second accommodation portion)
22c Stopper hole
22d Pressing surface (second pressing surface)
22e Protruding portion
24 Stop pin
25 Stopper mechanism
27 Coil Spring (elastic member)
28 Resin member (elastic member)
30 Spring seat
301 End surface support portion
301a Recess
301b Hole
302 Outer periphery support portion

What is claimed is:

1. A damper device comprising:
a first rotor including a plurality of first accommodation portions, the plurality of first accommodation portions each including a pair of first pressing surfaces on both circumferential end surfaces thereof;
a second rotor rotatable relative to the first rotor, the second rotor including a plurality of second accommodation portions and a protruding portion, the plurality of second accommodation portions each including a pair of second pressing surfaces on both circumferential end surfaces thereof, the protruding portion circumferentially protruding on at least one of the pair of second pressing surfaces of the second accommodation portion;
a plurality of elastic members accommodated in a plurality of pairs of the first and second accommodation portions, the plurality of elastic members configured to elastically couple the first rotor and the second rotor in a rotational direction; and
a spring seat configured to support at least one end surface of at least one of the plurality of elastic members, the spring seat including
an end surface support portion including a recess on a radially middle part thereof, the recess recessed toward the at least one of the plurality of elastic members, the end surface support portion configured to support the at least one end surface of the at least one of the plurality of elastic members, the end surface support portion supported by one of the pair of first pressing surfaces of the first accommodation portion accommodating the at least one of the plurality of elastic members and one of the pair of second pressing surfaces of the second accommodation portion accommodating the at least one of the plurality of elastic members, and
an outer periphery support portion configured to support part of a radially outer part of the at least one of the plurality of elastic members, wherein the protruding portion of the second rotor is fitted to the recess of the spring seat.

2. The damper device according to claim 1, wherein the recess includes a hole circumferentially penetrating therethrough.

3. The damper device according to claim 1, wherein
the first rotor includes a first plate and a second plate, the first and second plates disposed axially apart from each other at an interval, and
the second rotor is disposed axially between the first plate and the second plate.

4. The damper device according to claim 1, further comprising
a stopper mechanism including a stop member and a stopper hole, the stop member mounted on the first rotor, the stopper hole provided in the second rotor, the stopper hole circumferentially elongated, the stopper hole penetrated by the stop member.

5. The damper device according to claim 4, wherein
the stopper hole extends at one circumferential end thereof toward the protruding portion.

* * * * *